United States Patent
Michishita et al.

(10) Patent No.: US 8,829,876 B2
(45) Date of Patent: Sep. 9, 2014

(54) SWITCHING REGULATOR AND OPERATION CONTROL METHOD THEREOF

(75) Inventors: Yuusuke Michishita, Ikeda (JP); Shinya Shimizu, Itami (JP)

(73) Assignee: Ricoh Company, Ltd., Tokyo (JP)

( * ) Notice: Subject to any disclaimer, the term of this patent is extended or adjusted under 35 U.S.C. 154(b) by 271 days.

(21) Appl. No.: 13/266,206

(22) PCT Filed: Apr. 20, 2010

(86) PCT No.: PCT/JP2010/057313
§ 371 (c)(1),
(2), (4) Date: Oct. 25, 2011

(87) PCT Pub. No.: WO2010/125983
PCT Pub. Date: Nov. 4, 2010

(65) Prior Publication Data
US 2012/0038341 A1   Feb. 16, 2012

(30) Foreign Application Priority Data

Apr. 27, 2009   (JP) .................................. 2009-108001

(51) Int. Cl.
*H02M 3/156* (2006.01)
*H02M 3/158* (2006.01)
(52) U.S. Cl.
CPC .............. *H02M 3/158* (2013.01); *H02M 3/156* (2013.01)
USPC ........................................................ 323/284
(58) Field of Classification Search
USPC ................................. 323/282–284
See application file for complete search history.

(56) References Cited

U.S. PATENT DOCUMENTS

| 5,912,552 | A | 6/1999 | Tateishi |
| 7,479,773 | B2 | 1/2009 | Michishita |
| 7,800,351 | B2 * | 9/2010 | Gan .............................. 323/283 |
| 7,852,055 | B2 | 12/2010 | Michishita |
| 7,969,134 | B2 * | 6/2011 | Chen ............................ 323/285 |
| 2005/0057238 | A1 | 3/2005 | Yoshida |

(Continued)

FOREIGN PATENT DOCUMENTS

| CN | 101119067 A | 2/2008 |
| CN | 101546954 | 9/2009 |

(Continued)

OTHER PUBLICATIONS

Chinese official action dated Nov. 26, 2013 in corresponding Chinese patent application No. 2010 80 02 8713.9, 16 pages.

*Primary Examiner* — Harry Behm
(74) *Attorney, Agent, or Firm* — Cooper & Dunham LLP (57) ABSTRACT

A non-isolated type switching regulator having an inductor includes: a switch element; a rectification element; an error amplifying circuit section amplifying a voltage difference between a feedback voltage and a first reference voltage and outputting as an error voltage; a first voltage comparison circuit section performing a voltage comparison of a ramp voltage which performs a voltage change set beforehand with the error voltage to be synchronized with the switching of the switch element and producing and outputting a first comparison signal; a second voltage comparison circuit performing a voltage comparison of the error voltage with a second reference voltage and producing and outputting a second comparison signal; an oscillation circuit section starting an oscillation based on the second comparison signal and producing and outputting a clock signal; and a control circuit section performing a switching control of the switch element based on the clock signal and the first comparison signal.

13 Claims, 9 Drawing Sheets

(56) References Cited

U.S. PATENT DOCUMENTS

| | | | |
|---|---|---|---|
| 2007/0247131 | A1 | 10/2007 | Sohma |
| 2009/0174384 | A1 | 7/2009 | Michishita et al. |
| 2009/0302820 | A1 | 12/2009 | Shimizu et al. |
| 2009/0322299 | A1 | 12/2009 | Michishita et al. |
| 2010/0066328 | A1 | 3/2010 | Shimizu et al. |
| 2011/0169464 | A1 | 7/2011 | Michishita et al. |

FOREIGN PATENT DOCUMENTS

| | | |
|---|---|---|
| JP | 10-225105 | 8/1998 |
| JP | 2000-152610 | 5/2000 |
| JP | 2003-304682 | 10/2003 |
| JP | 2005-341789 | 12/2005 |
| JP | 2006-166667 | 6/2006 |
| JP | 2007-209180 | 8/2007 |
| JP | 2007-259599 | 10/2007 |
| JP | 2008-67495 | 3/2008 |
| JP | 2008-206214 | 9/2008 |
| JP | 2008-228514 | 9/2008 |
| JP | 2009-303303 | 12/2009 |
| JP | 2010-63276 | 3/2010 |
| JP | 2010-68671 | 3/2010 |
| JP | 2010-88218 | 4/2010 |
| JP | 2010-148312 | 7/2010 |
| JP | 2010-259257 | 11/2010 |
| KR | 10-0812480 | 3/2008 |

* cited by examiner

SWITCHING REGULATOR AND OPERATION CONTROL METHOD THEREOF

TECHNICAL FIELD

The present invention relates to a switching regulator which functions as a DC-DC converter, and in particular, relates to a switching regulator which has a PWM (Pulse Width Modulation) control mode and a VFM (Variable Frequency Modulation) control mode and switches the control modes based on, for example, a state of an output current.

BACKGROUND ART

In recent years, power saving of an electronic device has been demanded in consideration of environmental issues, and the trend to save power has been particularly prominent in an electronic device driven by a battery. Generally, in order to achieve such power saving, reducing the electric power consumed by the electronic device, and improving the efficiency of a power circuit itself and suppressing wasteful electric power consumption are important. A non-isolated switching regulator using an inductor is widely used as a high-efficiency power circuit used for a small electronic device.

There are two major control modes of the switching regulator. A first one is a PWM (Pulse Width Modulation) control mode, in which ratios of ON-time and OFF-time of a switching transistor are changed by maintaining a constant frequency of a pulse signal and changing a duty cycle of the pulse signal, and an average value of an output voltage after smoothing is controlled to be constant. A second one is a VFM (Variable Frequency Modulation) control mode, in which a ratio of an ON-time to a predetermined period of a switching transistor is changed by maintaining a constant pulse duration of a pulse signal and changing a frequency of the pulse signal, and an average value of an output voltage after smoothing is controlled to be constant. In addition, there are two types of the VFM control mode. A first one involves changing a frequency of a pulse signal continuously and a second one involves changing a frequency of a pulse signal pseudoly by dividing a clock pulse signal of the switching regulator in the PWM control mode. The VFM control mode is also described as a PFM (Pulse Frequency Modulation) control mode.

The electric power consumption of the switching regulator itself increases in proportion to a switching frequency. In the PWM control mode, an ON/OFF control of a switching transistor is performed at a constant cycle even in the case of a light load; therefore the efficiency in the case of the light load is degraded. On the other hand, in the VFM control mode, the switching frequency of the switching transistor fluctuates based on a load current; therefore, an influence of noise and a ripple on the device increases, the number of switching times decreases for the light load, and the efficiency becomes better than in the PWM control mode. Thus, conventionally, there is a switching regulator which enhances a power supply efficiency from the case of the light load to a case of a heavy load by performing a switching of a PWM control and a VFM control based on a load condition.

However, because noise occurring from the switching regulator greatly affects a peripheral device, it is necessary to give consideration to such noise. In noise components of the switching regulator, a noise component in the switching frequency of the switching transistor is greatest. In the VFM control mode, a frequency fluctuates based on a load current; therefore the noise component occurring from the switching regulator fluctuates based on the load current. Regarding the above-described noise, the switching regulator needs to be used with consideration of the peripheral device.

In addition, generally, in the case of being controlled in the VFM control mode, a ripple of an output voltage becomes larger than in the case of being controlled in the PWM control mode. Even in the VFM control mode, a maximum switching frequency in the VFM control is inconsistent; therefore in a case where the switching regulator is turned on and energy is supplied to an inductor before an inductor current becomes zero, there is a problem in that the ripple of the output voltage further becomes large.

Figure 8:
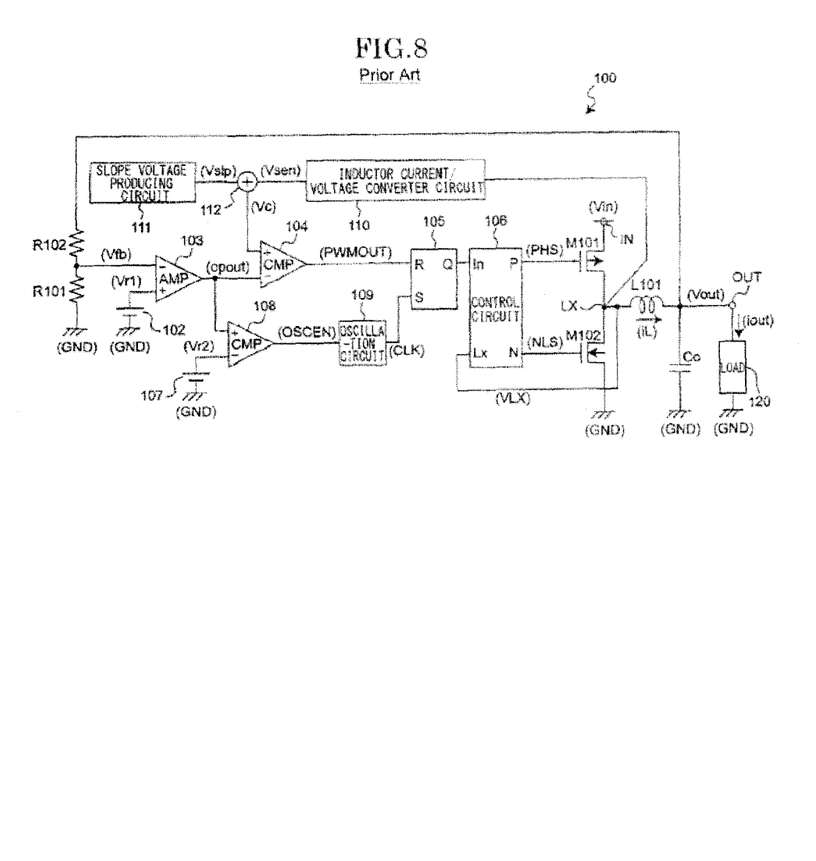
FIG. 8 is a circuit diagram illustrating a conventional example of a current mode controlled switching regulator.

FIG. 8 is a circuit diagram illustrating a conventional example of a current mode controlled switching regulator which performs a switching of a PWM control and a VFM control.

In FIG. 8, when an electric charge stored in an output capacitor Co is discharged in a load 120 connected to an output terminal OUT, an output voltage Vout gradually falls, and an error voltage opout rises. When the error voltage opout exceeds a second reference voltage Vr2, an enable signal OSCEN, which is an output signal of a comparator 108, inverts and the enable signal OSCEN becomes in a high state. When the enable signal OSCEN becomes in a high state, an oscillation circuit 109 immediately produces one high-state pulse and outputs as a clock signal CLK. An RS flip-flop circuit 105 is set by the clock signal CLK, and an output Q becomes in a high state. And then, a control circuit 106 sets each of control signals PHS and NLS to be in a low state and turns a switching transistor M101 on and a synchronous rectification transistor M102 off.

When the switching transistor M101 is turned on, an input voltage Vin is applied to an inductor L101, and therefore an inductor current iL flows through the inductor L101. An increasing rate of the inductor current iL regarding time is proportional to a voltage difference between the input voltage Vin and the output voltage Vout. When the inductor current iL exceeds an output current iout, the output voltage Vout rises to charge the output capacitor Co, and the error voltage opout falls. When the error voltage opout falls to less than the second reference voltage Vr2, the enable signal OCSEN from the comparator 108 returns to be in a high state. Therefore, the oscillation circuit 109 outputs only one pulse as the clock signal CLK and stops an oscillation operation.

The inductor current iL is converted to an inductor voltage Vsen by an inductor current/voltage converter circuit 110 and outputted. A compensation slope voltage Vs1$p$ outputted from a slope voltage producing circuit 111 is added to the inductor voltage Vsen in an adding circuit 112 and becomes a ramp voltage Vc, and the ramp voltage Vc is inputted to a non-inverting input of a comparator 104. The ramp voltage Vc rises as time goes by, and when the ramp voltage Vc exceeds the error voltage opout, an output signal PWMOUT of the comparator 104 inverts and becomes in a high state. When the output signal PWMOUT becomes in a high state, the RS flip-flop circuit 105 is reset and the output Q becomes in a low state, and the control circuit 106 sets each of the control signals PHS and NLS to be in a high state. Therefore, the switching transistor M101 is turned off and the synchronous rectification transistor M 102 is turned on.

When the switching transistor M101 is turned off, due to an influence of a counter-electromotive force of the inductor L101, a voltage VLX of a connection part LX becomes a negative voltage. Therefore, the inductor voltage Vsen, which is the output voltage of the inductor current/voltage converter circuit 110, falls to a ground voltage GND, and concurrently the slope voltage producing circuit 111 stops operating and the compensation slope voltage Vs1$p$ falls to the ground voltage GND. As a result, the ramp voltage Vc falls to the ground voltage GND, and the output signal PWMOUT of the comparator 104 immediately returns to be in a low state.

When a current value of the inductor current iL falls to less than or equal to the output current iout, the output voltage Vout starts to fall, and when the output voltage Vout falls, the error voltage opout rises. When the error voltage opout exceeds the second reference voltage Vr2, the process returns to the beginning of the above-described explanation and the same operation as described above is performed, and then the operation as described above is repeated.

In the VFM control mode, the smaller the output current iout is, the longer a time for the fall of the output voltage Vout takes; therefore a duration in which the switching transistor M101 is on becomes long, that is, the switching frequency becomes low. In addition, the smaller the output current iout is, the faster the output voltage Vout rises; therefore a fall speed of the error voltage opout becomes fast, and the duration in which the switching transistor M101 is on becomes short. When the output current iout increases, and the switching frequency becomes high, and the error voltage opout becomes always equal to or more than the second reference voltage Vr2, the VFM control mode is automatically switched to the PWM control mode.

In the PWM control mode, the error voltage opout becomes always equal to or more than the second reference voltage Vr2; therefore the enable signal OSCEN, which is the output signal of the comparator 108, becomes in a high state. And then, the oscillation circuit 109 performs an oscillation at a predetermined frequency and produces and outputs a clock signal CLK. When the clock signal CLK becomes in a high state, the RS flip-flop circuit 105 is set and the output Q becomes in a high state. And then, the switching transistor M101 is turned on, and the synchronous rectification transistor M102 is turned off and the inductor current iL flows. The inductor current iL is converted to the inductor voltage Vsen in the inductor current/voltage converter circuit 110, and the compensation slope voltage Vs1p is added and the ramp voltage Vc is produced and then the ramp voltage Vc is inputted to the non-inverting input of the comparator 104.

When the ramp voltage Vc exceeds the error voltage opout, the output signal from the comparator 104 becomes in a high state, and the RS flip-flop circuit 105 is reset. And then, the control circuit 106 sets each of the control signals PHS and NLS to be in a high state, and turns the switching transistor M101 off and the synchronous rectification transistor M102 on. As a result, the ramp voltage vc falls to the ground voltage GND, and the output signal PWMOUT returns to be in a low state. The inductor current iL continues flowing via the synchronous rectification transistor M102, and before the inductor current iL becomes zero, the clock signal CLK becomes in a high state again, and the operation as described above is repeated. In the PWM control mode, the larger the output current iout becomes, the longer the ON-time of the switching transistor M101 becomes.

Figure 9:
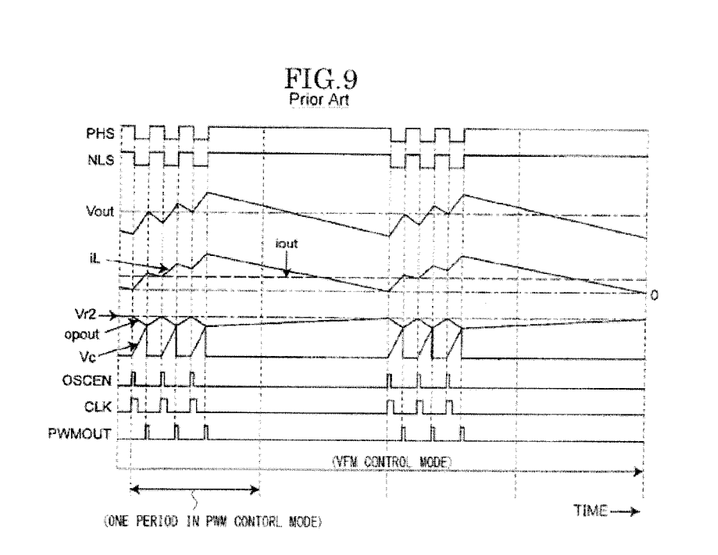
FIG. 9 is a timing diagram illustrating a problem in the switching regulator of FIG. 8.

However, the conventional switching regulator as described in FIG. 8 is not capable of controlling a maximum switching frequency in the VFM control mode, and as described as a waveform diagram of FIG. 9, depending on a setting of a circuit parameter, equal to or more than 2 times of switching is performed in one period of a switching cycle in the PWM control mode. Therefore, the maximum switching frequency in the VFM control mode becomes larger than a switching frequency in the PWM control mode, and there is a problem such that it is necessary to make consideration for noise which is equal to or more than the switching frequency in the PWM control mode. In addition, there is a problem such that a ripple of the output voltage Vout becomes large, because the switching transistor M101 is turned on and energy is supplied to the inductor L101 before the inductor current iL becomes zero.

Consequently, a conventional step-down switching regulator of a fixed frequency type is capable of setting a maximum oscillation frequency (for example, see Japanese patent application publication No. H10-225105). However, as an oscillator always operates, a consumption current increases and this prevents the efficiency from improving. And additionally, a step-down switching regulator of a variable frequency type has a problem such that it is not capable of setting the maximum switching frequency in the VFM control mode as well as the switching regulator of FIG. 8.

SUMMARY OF THE INVENTION

An object of the present invention is to provide a solution for the above problems, and in particular, an object of the present invention is to provide a switching regulator and its operation control method capable of equaling the maximum switching frequency in the VFM control mode to the switching frequency in the PWM control mode by a simple circuit configuration, making the ripple of the output voltage smaller, and improving an efficiency in the VFM control mode.

In order to achieve the above object, an embodiment of the present invention is to provide: a switching regulator which has an inductor and is a non-isolated type, the switching regulator converting an input voltage inputted to an input terminal to a predetermined constant voltage and outputting as an output voltage from an output terminal and automatically performing a switching of a PWM control and a VFM control, comprising: a switch element which performs a switching based on a control signal inputted to a control electrode and a charge to the inductor by the input voltage; a rectification element which performs a discharge of the inductor when the switch element is turned off and the charge to the inductor is stopped; an error amplifying circuit section which amplifies a voltage difference between a feedback voltage proportional to the output voltage and a predetermined first reference voltage and outputs as an error voltage; a first voltage comparison circuit section which performs a voltage comparison of a ramp voltage which performs a voltage change set beforehand with the error voltage to be synchronized with the switching of the switch element and produces and outputs a first comparison signal which indicates a result of the comparison; a second voltage comparison circuit which performs a voltage comparison of the error voltage with a predetermined second reference voltage and produces and outputs a second comparison signal which indicates a result of the comparison; an oscillation circuit section which starts an oscillation operation based on the second comparison signal and produces and outputs a clock signal of a predetermined frequency; and a control circuit section which performs a switching control of the switch element based on the clock signal and the first comparison signal, wherein the oscillation circuit section starts the oscillation operation based on the second comparison signal, and stops the oscillation operation based on the second comparison signal when the produced clock signal becomes in a state opposite to a state where the switch element is turned on and the charge to the inductor is performed.

In order to achieve the above object, an embodiment of the present invention is to provide: an operation control method of a switching regulator, the switching regulator including: a switch element which performs a switching based on a control signal inputted to a control electrode; an inductor in which a charge is performed by an input voltage inputted to an input terminal by the switching of the switch element; and a rectification element which performs a discharge of the inductor when the switch element is turned off and a charge to the inductor is stopped, the switching regulator performing a switching control for the switch element such that an output voltage from an output terminal becomes a predetermined constant voltage, and converting the input voltage inputted to the input terminal to a predetermined constant voltage and outputting as an output voltage from the output terminal, and automatically performing a switching of a PWM control and a VFM control, comprising the steps of: amplifying a voltage difference between a feedback voltage proportional to the output voltage and a predetermined first reference voltage and producing an error voltage; producing a ramp voltage which performs a voltage change set beforehand; performing a voltage comparison of the error voltage with the ramp voltage to be synchronized with the switching of the switching element and producing a first comparison signal which indicates a result of the comparison; performing a voltage comparison of the error voltage with a predetermined second reference voltage and producing a second comparison signal which indicates a result of the comparison; producing a clock signal of a predetermined frequency based on the second comparison signal; stopping a production of the clock signal based on the second comparison signal when the produced clock signal becomes in a state opposite to a state where the switch element is turned on and the charge to the inductor is performed; and performing the switching control of the switch element based on the clock signal and the first comparison signal.

DESCRIPTION OF EMBODIMENT

Figure 1:
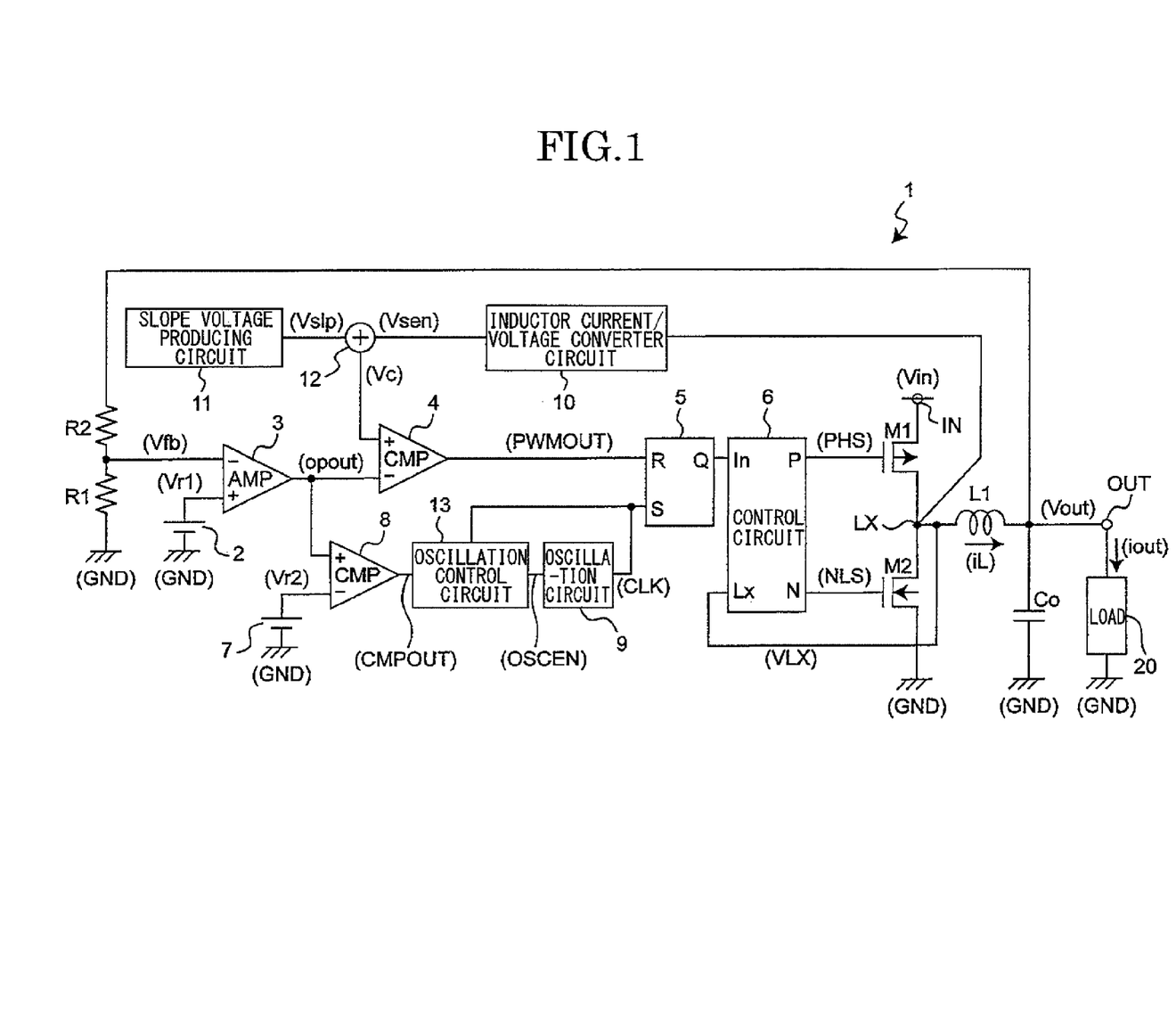
FIG. 1 is a diagram illustrating a circuit example of a switching regulator in an embodiment of the present invention.

Next, the present invention will be explained closely based on an embodiment illustrated in drawings.
[Embodiment]
FIG. 1 is a diagram illustrating a circuit example of a switching regulator in the embodiment of the present invention.

In FIG. 1, a switching regulator 1 functions as a current mode controlled switching regulator of a synchronous rectification type which steps down an input voltage Vin inputted to an input terminal IN to a predetermined constant voltage and outputs as an output voltage Vout from an output terminal OUT to a load 20. And the switching regulator 1 performs the above step-down operation by automatically performing a switching of a PWM control and a VFM control based on an output current iout outputted from an output terminal OUT.

The switching regulator 1 includes a switching transistor M1 of a PMOS transistor and a synchronous rectification transistor M2 of an NMOS transistor.

In addition, the switching regulator 1 includes a first reference voltage generating circuit 2 which generates and outputs a predetermined first reference voltage Vr1, resistances R1 and R2 for an output voltage detection, an inductor L1, an output capacitor Co, an error amplifying circuit 3, a first comparator 4, an RS flip-flop circuit 5, a control circuit 6, a second reference voltage generating circuit 7 which generates and outputs a predetermined second reference voltage Vr2, and a second comparator 8. The switching regulator 1 further includes an oscillation circuit 9 which produces and outputs a predetermined clock signal CLK, an inductor current/voltage converter circuit 10 which detects an inductor current iL flowing through the inductor L1 and produces and outputs an inductor voltage Vsen based on the detected inductor current iL, a slope voltage producing circuit 11 which produces and outputs a slope voltage $Vs1p$ forming a predetermined sawtooth-wave signal, an adding circuit 12, and an oscillation control circuit 13 which performs a drive control of the oscillation circuit 9 based on an output signal of the second comparator 8.

A switch element includes the switching transistor M1. A rectification element includes the synchronous rectification transistor 2. An error amplifying circuit section includes the first reference voltage generating circuit 2, the error amplifying circuit 3, and the resistances R1 and R2. A first voltage comparison circuit section includes the first comparator 4, the inductor current/voltage converter circuit 10, the slope voltage producing circuit 11 and the adding circuit 12. A second voltage comparison circuit section includes the second reference voltage generating circuit 7 and the second comparator 8. An oscillation circuit section includes the oscillation circuit 9 and the oscillation control circuit 13. A control circuit section includes the RS flip-flop circuit 5 and the control circuit 6. A first voltage comparison circuit includes the first comparator 4. In the switching regulator 1, each circuit except for the inductor L1 and the output capacitor Co may be incorporated into one IC, and in some cases, each circuit except for the switching transistor M1 and/or the synchronous rectification transistor M2, the inductor L1 and the output capacitor Co may be incorporated into one IC.

Between the input terminal IN and a ground voltage GND, the switching transistor M1 and the synchronous rectification transistor M2 are connected in series. Between a connection part LX which is between the switching transistor M1 and the synchronous rectification transistor M2 and the output terminal OUT, the inductor L1 is connected. Between the output terminal OUT and the ground voltage GND, the resistances R2 and R1 are connected in series and the output capacitor Co is connected. A feedback voltage Vfb is outputted from a connection part between the resistances R2 and R1. In the error amplifying circuit 3, the feedback voltage Vfb is inputted to an inverting input and the first reference voltage Vr1 is inputted to a non-inverting input. The error amplifying circuit 3 amplifies a voltage difference between the feedback voltage Vfb and the first reference voltage Vr1 and produces and outputs an error voltage opout to an inverting input of the first comparator 4. The error voltage opout is raised by the error amplifying circuit 3 when the output voltage Vout falls, and the error voltage opout falls by the error amplifying circuit 3 when the output voltage Vout rises.

The inductor current/voltage converter circuit 10 produces and outputs the inductor voltage Vsen from the input voltage Vin and a voltage VLX of the connection part LX. The slope voltage Vs1p from the slope voltage producing circuit 11 and the inductor voltage Vsen from the inductor current/voltage converter circuit 10 are inputted to the adding circuit 12, respectively, and the adding circuit 12 adds the slope voltage Vs1p and the inductor voltage Vsen and produces and outputs a ramp voltage Vc proportional to the inductor current iL to a non-inverting input of the first comparator 4. The first comparator 4 performs a voltage comparison of the error voltage opout from the error amplifying circuit 3 with the ramp voltage Vc outputted from the adding circuit 12 and produces and outputs a first comparison signal PWMOUT forming a pulse signal to a reset input R of the RS flip-flop circuit 5.

In the second comparator 8, the error voltage opout is inputted to a non-inverting input and the second reference voltage Vr2 is inputted to an inverting input, respectively, and an output is connected to the oscillation control circuit 13. The second comparator 8 performs a voltage comparison of the second reference voltage Vr2 with the error voltage opout, and when the error voltage opout becomes equal to or more than the second reference voltage Vr2, the second comparator 8 sets a second comparison signal CMPOUT which is an output signal to be in a high state, and when the error voltage opout becomes less than the second reference voltage Vr2, the second comparator 8 sets the second comparison signal CMPOUT to be in a low state. The oscillation control circuit 13 produces an enable signal OSCEN from the second comparison signal CMPOUT from the second comparator 8 and the clock signal CLK outputted from the oscillation circuit 9, and outputs the enable signal OSCEN to the oscillation circuit 9.

The oscillation circuit 9 starts an oscillation operation and produces and outputs a clock signal CLK, when a high-state enable signal OSCEN is inputted, and the oscillation circuit 9 stops the oscillation operation and stops an output of the clock signal CLK and outputs a low-state signal, when a low-state enable signal OSCEN is inputted. In this manner, the oscillation circuit 9 outputs a predetermined clock signal CLK, when the enable signal OSCEN becomes in a high state, and the oscillation circuit 9 stops the oscillation operation and sets the clock signal CLK to be in a low state, when the enable signal OSCEN becomes in a low level.

The clock signal CLK outputted from the oscillation circuit 9 is inputted to a set input S of the RS flip-flop circuit 5 and the oscillation control circuit 13, respectively, and an output Q of the RS flip-flop circuit 5 is connected to an input In of the control circuit 6. The RS flip-flop circuit 5 sets the output Q to be in a high state, when a high-state signal is inputted to the set input S, and the RS flip-flop circuit 5 sets the output Q to be in a low state, when a high-state signal is inputted to a reset input R of the RS flip-flop circuit 5. An output signal of the RS flip-flop circuit 5 and the voltage VLX of the connection part LX are inputted to the control circuit 6, respectively. An output P of the control circuit 6 is connected to a gate of the switching transistor M1 and an output N of the control circuit 6 is connected to a gate of the synchronous rectification transistor M2.

When the output signal of the RS flip-flop circuit 5 becomes in a high state, the control circuit 6 sets each of control signals PHS and NLS to be in a low state, and turns the switching transistor M1 on and the synchronous rectification transistor M2 off. When the output signal of the RS flip-flop circuit 5 becomes in a low state, the control circuit 6 sets each of the control signals PHS and NLS to be in a high state, and turns the switching transistor M1 off and the synchronous rectification transistor M2 on. However, when the voltage VLX of the connection part LX becomes equal to or more than 0V, regardless of the output signal of the RS flip-flop circuit 5, the control circuit 6 sets the control signal NLS to be in a low state and turns the synchronous rectification transistor M2 off. In this manner, the control circuit 6 can prevent a reverse flow of the inductor current iL.

The inductor current/voltage converter circuit 10 amplifies a source-to-drain voltage of the switching transistor M1 and outputs as an inductor voltage Vsen. Since an on-state resistance of the switching transistor M1 is approximately constant regardless of a drain current, the source-to-drain voltage of the switching transistor M1 is proportional to a drain current of the switching transistor M1. And since all the drain current becomes the inductor current iL, the source-to-drain voltage of the switching transistor M1 becomes a voltage which is proportional to the inductor current iL.

The slope voltage producing circuit 11 produces a slope voltage Vs1p which is added to the inductor voltage Vsen, in order to prevent a subharmonic oscillation. The inductor voltage Vsen and the slope voltage Vs1p are added in the adding circuit 12, and are outputted as the ramp voltage Vc to the non-inverting input of the first comparator 4.

Figure 2:
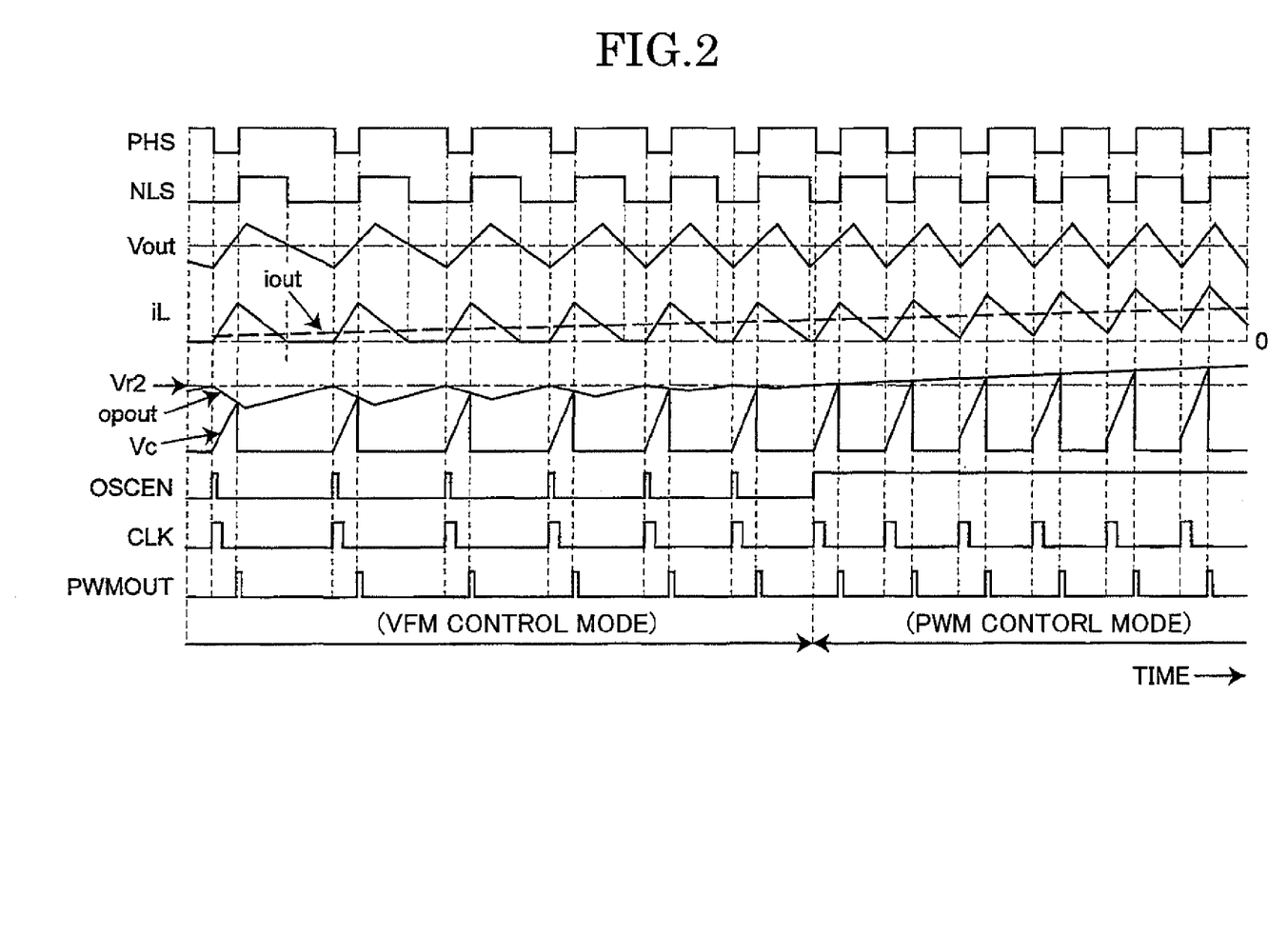
FIG. 2 illustrates a timing diagram of an operation example of the switching regulator of FIG. 1.

In the above-described configuration, FIG. 2 illustrates a timing diagram of an operation example of the switching regulator of FIG. 1, and with reference to FIG. 2, an operation of the switching regulator 1 of FIG. 1 will be explained.

Firstly, an operation in the VFM control mode will be explained.

When an electric charge stored in the output capacitor Co is discharged in the load 20 connected to the output terminal OUT, the output voltage Vout gradually falls. And then, the error voltage opout rises, and when the error voltage opout becomes equal to or more than the second reference voltage Vr2, the second comparison signal CMPOUT becomes in a high state. When the second comparison signal CMPOUT becomes in a high state, the oscillation control circuit 13 immediately sets the enable signal OSCEN to be in a high state.

When the enable signal OSCEN becomes in a high state, the oscillation circuit 9 immediately starts the oscillation operation and outputs a predetermined clock signal CLK formed by a high-state pulse to the set input S. The RS flip-flop circuit 6 is set by the high-state pulse in the clock signal CLK, and the output Q becomes in a high state. Then the control circuit 6 sets each of the control signals PHS and NLS to be in a low state, and turns the switching transistor M1 on and the synchronous rectification transistor M2 off. When the switching transistor M1 is turned on, the input voltage Vin is connected to the inductor L1, and the inductor current iL flows through the inductor L1. An increasing rate of the inductor current iL regarding time is proportional to a voltage difference between the input voltage Vin and the output voltage Vout.

On the other hand, the oscillation control circuit 13 sets the enable signal OSCEN to be in a low state, in a case where the second comparison signal CMPOUT is in a low state when the clock signal CLK becomes in a low state from a high state, and the oscillation control circuit 13 continuously sets the enable signal OSCEN to be in a high state, in a case where the second comparison signal CMPOUT is in a high state.

When the inductor current iL exceeds the output current iout, the output voltage Vout rises to charge the output capacitor Co, and along with this, the error voltage opout falls. When the error voltage opout becomes less than the second reference voltage Vr2, the second comparison signal CMPOUT returns to a low state. Therefore, the oscillation control circuit 13 sets the enable signal OSCEN to be in a low state when the clock signal CLK becomes in a low state as described above, and the oscillation circuit 9 stops the oscillation operation and stops an output of the high-state pulse and sets the clock signal CLK to be in a low state. That is, the oscillation circuit 9 outputs only one high-state pulse.

The inductor current iL is converted to the inductor voltage Vsen in the inductor current/voltage converter circuit 10, and the slope voltage Vs1p outputted from the slope voltage producing circuit 11 is added to the inductor voltage Vsen in the adding circuit 12 and the ramp voltage Vc is produced. The ramp voltage Vc rises as time goes by, and when the ramp voltage Vc exceeds the error voltage opout, the first comparison signal PWMOUT inverts and becomes in a high state.

When the first comparison signal PWMOUT becomes in a high state, the RS flip-flop circuit 5 is reset and the output Q becomes in a low state. The control circuit 6 sets each of the control signals PHS and NLS to be in a high state, and turns the switching transistor M1 off and the synchronous rectification transistor M2 on. When the switching transistor M1 is turned off, due to an influence of a counter-electromotive force of the inductor 101, a voltage of the connection part LX becomes a negative voltage. Therefore, the inductor voltage Vsen from the inductor current/voltage converter circuit 10 falls to the ground voltage GND, and concurrently the slope voltage producing circuit 11 also stops operating and the slope voltage Vs1p falls to the ground voltage GND. As a result, the ramp voltage Vc falls to the ground voltage GND, and the first comparison signal PWMOUT immediately returns to a low state. Even when the switching transistor M1 is turned off, the synchronous rectification transistor M2 is turned on, and the inductor current iL continues flowing from the ground voltage GND via the synchronous rectification transistor M2. A decreasing rate of the inductor current iL at this time regarding time is proportional to the output voltage Vout.

When all the energy stored in the inductor L1 is discharged and the inductor current iL becomes zero, an electric current flows to the ground voltage GND via the inductor L1 and the synchronous rectification transistor M2 from a side of the output terminal OUT, that is, a reverse current occurs, and a conversion efficiency of the switching regulator is greatly degraded. Therefore, in order to prevent an occurrence of the above reverse current, when the voltage VLX of the connection part LX becomes 0V, regardless of an output signal of the RS flip-flop circuit 5, the control circuit 6 sets the control signal NLS to be in a low state and turns the synchronous rectification transistor M2 off. When the inductor current iL falls to less than or equal to the output current iout, the output voltage Vout starts to fall, and when the output voltage Vout falls, the error voltage opout rises. When the error voltage opout becomes equal to or more than the second reference voltage Vr2, the process returns to beginning of the above-described explanation, and then the operation as described above is repeated.

When operating in the VFM mode operation, the smaller the output current iout is, the longer a time for the fall of the output voltage Vout takes; therefore a duration in which the switching transistor M1 is on becomes long, that is, the switching frequency becomes low. In addition, the smaller the output current iout is, the faster the output voltage Vout rises; therefore a fall speed of the error voltage opout becomes fast, and the duration in which the switching transistor M1 is on becomes short. When the output current iout increases and the switching frequency becomes high and the error voltage opout becomes always equal to or more than the second reference voltage Vr2, the VFM control mode is automatically switched to the PWM control mode.

An operation in the PWM mode will be explained as follows.

The error voltage opout becomes always equal to or more than the second reference voltage Vr2; therefore the second comparison voltage CMPOUT always becomes in a high state. Thus, in the PWM control mode, the oscillation control circuit 13 always sets the enable signal OSCEN to be in a high state, and the oscillation circuit 9 always performs an oscillation operation at a predetermined frequency and outputs a predetermined clock signal CLK. When the clock signal CLK becomes in a high state, the RS flip-flop circuit 5 is set and the output Q becomes in a high state. Therefore, as described in the explanation of the VFM control mode, when the switching transistor M1 is turned on and the synchronous rectification transistor M2 is turned off, the inductor current iL flows. The inductor current iL is converted to the inductor voltage Vsen in the inductor current/voltage converter circuit 10, and the compensation slope voltage Vs1p is added and the ramp voltage Vc is produced, and then the ramp voltage Vc is inputted to the non-inverting input of the comparator 4.

When the ramp voltage Vc exceeds the error voltage opout, the first comparison signal PWMOUT 104 becomes in a high state, and the RS flip-flop circuit 105 is reset. Therefore, the control circuit 6 sets each of the control signals PHS and NLS to be in a high state, and turns the switching transistor M1 off and the synchronous rectification transistor M2 on. As a result, the ramp voltage Vc falls to the ground voltage GND, and the first comparison signal PWMOUT returns to a low state. The inductor current iL continues flowing via the synchronous rectification transistor M2.

Before the inductor current iL becomes zero, a next pulse of the clock signal CLK becomes in a high state again, and the operation as described above is repeated. In the PWM control mode, the larger the output current iout becomes, the longer the ON-time of the switching transistor M1 becomes. In order for a smooth transition from the VFM control mode to the PWM control mode, a value of the inductor current iL at a critical point of switching from the VFM control mode to the PWM control mode is important.

Figure 3:
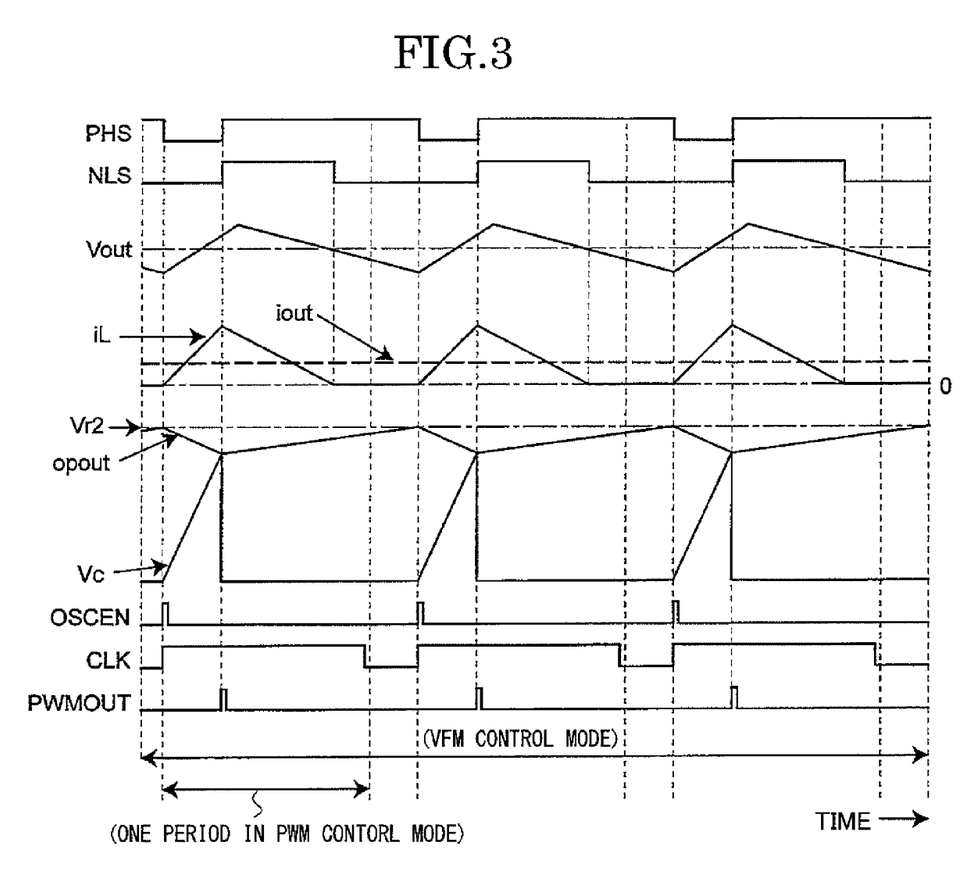
FIG. 3 illustrates a timing diagram of an example in the case of continuing a state where a switching frequency in the VFM mode becomes maximum.

Here, the switching frequency in the VFM control mode becomes maximum just before the transition to the PWM control mode. FIG. 3 is a timing diagram illustrating an example of a case where this state continues.

When the output voltage Vout falls and the error voltage opout becomes equal to or more than the second reference voltage Vr2, the second comparison signal CMPOUT inverts and becomes in a high state. When the second comparison signal CMPOUT becomes in a high state, the oscillation control circuit 13 sets the enable signal OSCEN to be in a high state from a low state. When the enable signal OSCEN becomes in a high state, the oscillation circuit 9 immediately starts the oscillation operation and produces a clock signal CLK formed by a predetermined high-state pulse and outputs. The RS flip-flop circuit 5 is set by the pulse, and the output Q becomes in a high state. The control circuit 6 sets each of the control signals PHS and NLS to be in a low state. Therefore, the switching transistor M1 is turned on, and the synchronous rectification transistor M2 is turned off.

At this time, during one period of a switching cycle in the PWM control mode after the clock signal CLK from the oscillation circuit 9 becomes in a high state, that is, during one period of the clock signal CLK, the oscillation control circuit 13 controls the enable signal OSCEN not to become in a high state from a low state again. In particular, when the high-state pulse produced in the oscillation circuit 9 just after the oscillation circuit 9 starting the oscillation operation becomes in a low state, and if the second comparison signal CMPOUT is in a low state, the oscillation control circuit 13 immediately sets the enable signal OSCEN to be in a low state and stops the oscillation operation of the oscillation circuit 9, and if the second comparison signal CMPOUT is in a high state, the oscillation control circuit 13 sets the enable signal OSCEN to be in a high state continuously and continues the oscillation operation of the oscillation circuit 9.

Thus, during one period of the switching cycle in the PWM control mode, the clock signal CLK does not become in a high state again, and the RS flip-flop circuit 5 is not set again. That is, during one period of the switching cycle in the PWM control mode, the switching transistor M1 always can be turned on only less than or equal to one time. Therefore, as illustrated in FIG. 3, a maximum frequency in the VFM control mode is controlled to be equal to the switching frequency in the PWM control mode.

In the case of the transition from the VFM control mode to the PWM control mode, for example, setting the second reference voltage Vr2 such that the output current iout becomes a critical current value which transitions from a discontinuous operation mode to a continuous operation mode makes it possible to transition smoothly to the PWM control mode without a fluctuation of the output voltage Vout.

Figure 4:
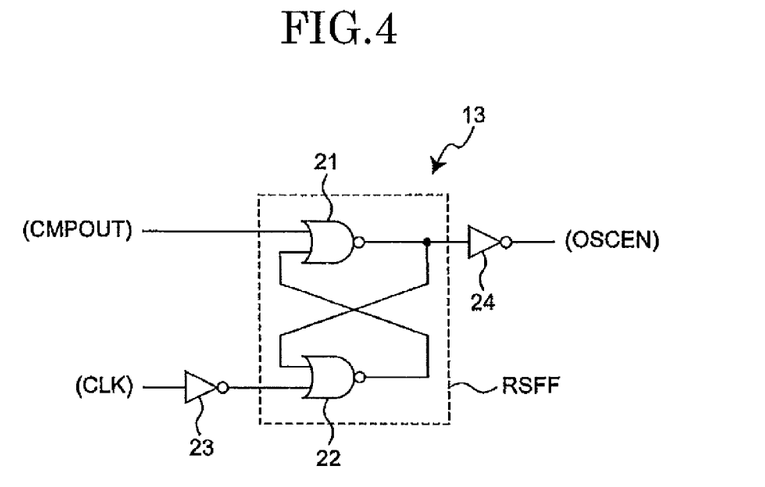
FIG. 4 is a diagram illustrating a circuit example of an oscillation control circuit 13 of FIG. 1.
Figure 5:
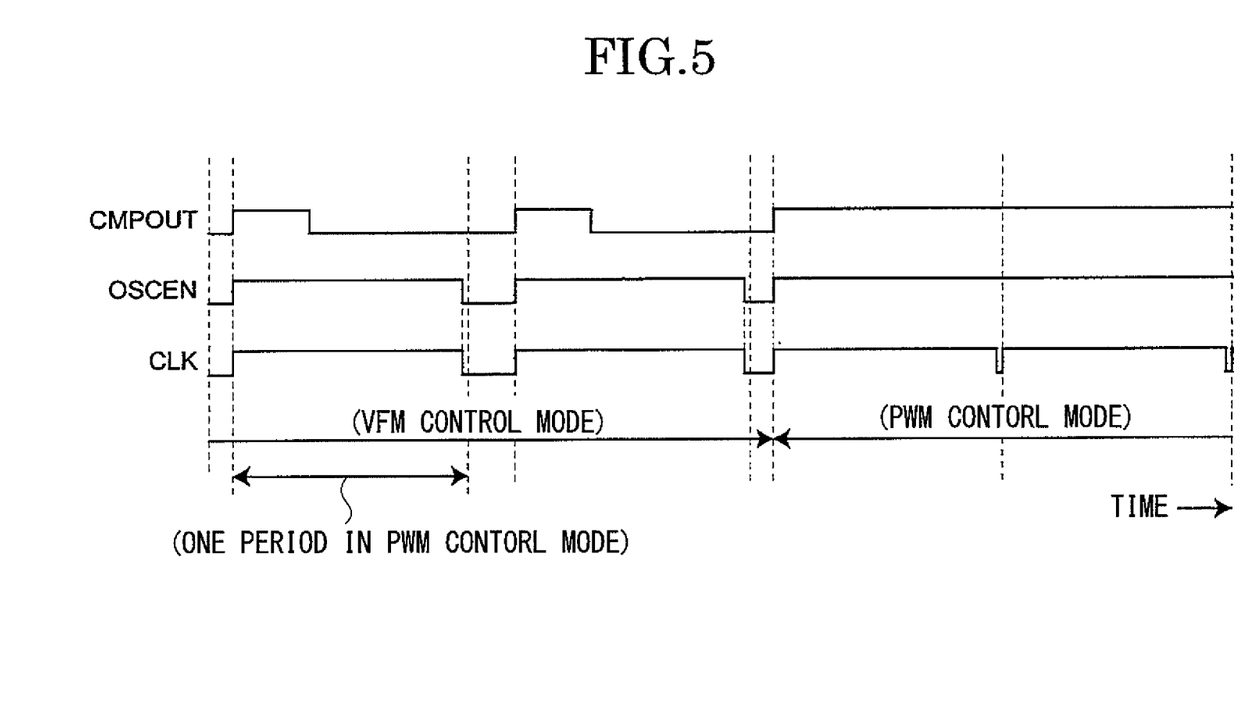
FIG. 5 illustrates a timing diagram of a waveform example of each signal in the case of using an oscillation control circuit 13 of FIG. 4.

Next, FIG. 4 is a diagram illustrating a circuit example of the oscillation control circuit 13 of FIG. 1, and FIG. 5 is a timing diagram illustrating a waveform example of each signal in the case of using the oscillation control circuit 13 of FIG. 4.

In FIG. 4, the oscillation control circuit 13 includes NOR circuits 21 and 22 and inverter circuits 23 and 24. The NOR circuits 21 and 22 form an RS flip-flop circuit RSFF.

The second comparison signal CMPOUT is inputted to one input of the NOR circuit 21, and the other input of the NOR circuit 21 is connected to an output of the NOR circuit 22. An output of the NOR circuit 21 is connected to an input of the inverter circuit 24, and the enable signal OSCEN is outputted from an output of the inverter circuit 24. And the clock signal CLK is inputted to one input of the NOR circuit 22 via the inverter circuit 23, and the other input of the NOR circuit 22 is connected to the output of the NOR circuit 21.

If the second comparison signal CMPOUT becomes in a high state when the clock signal CLK is in a low state, the enable signal OSCEN becomes in a high state, and the oscillation circuit 9 starts the oscillation operation, and the clock signal CLK becomes in a high state from a low state. While the clock signal CLK is in a high state, even if the second comparison signal CMPOUT is in a low state, the enable signal OSCEN does not become in a low state, and the oscillation circuit 9 continues the oscillation operation. If the second comparison signal CMPOUT becomes in a low state when the clock signal CLK becomes in a low state from a high state, the enable signal OSCEN becomes in a low state, and the oscillation circuit 9 stops the oscillation operation and is in a sleeping state.

That is, during one period of the switching cycle in the PWM control mode in which the clock signal CLK is in a high state, the oscillation circuit 9 can not become in a sleeping state, and the clock signal CLK does not become in a high state from a low state; therefore the RS flip-flop circuit 5 can not be set. That is, the switching transistor M1 always can be turned on only less than or equal to one time during one period of the switching cycle in the PWM control mode. Therefore, the maximum switching frequency in the VFM control mode is controlled to be equal to the switching frequency in the PWM control mode.

In FIG. 5, in order for an easier comprehension of a timing of a down edge of the enable signal OSCEN being synchronized with a timing of a down edge of the clock signal CLK, an example is illustrated in which the clock signal CLK falls to a low state from a high state within one period of the switching cycle in the PWM control mode and concurrently with the above fall of the clock signal CLK to a low state from a high state, the enable signal OSCEN falls to a low state from a high state. Theoretically, the maximum switching frequency in the VFM control mode can be equal to the switching frequency in the PWM control mode by getting a time of the enable signal OSCEN being in a low level closer to approximately zero in one period of the switching cycle in the PWM control mode, ideally. In the case of comparing FIG. 2 with FIG. 5, in FIG. 2, the timing of the down edge of the enable signal OSCEN and the timing of the down edge of the clock signal CLK do not synchronize with each other. However, in a case where a circuit illustrated in FIG. 4 is used as the oscillation control circuit 13, the timing of the down edge of enable signal OSCEN and the timing of the down edge of the clock signal CLK illustrated in FIG. 2 can synchronize with each other as well as the enable signal OSCEN and the clock signal CLK illustrated in FIG. 5.

Figure 6:
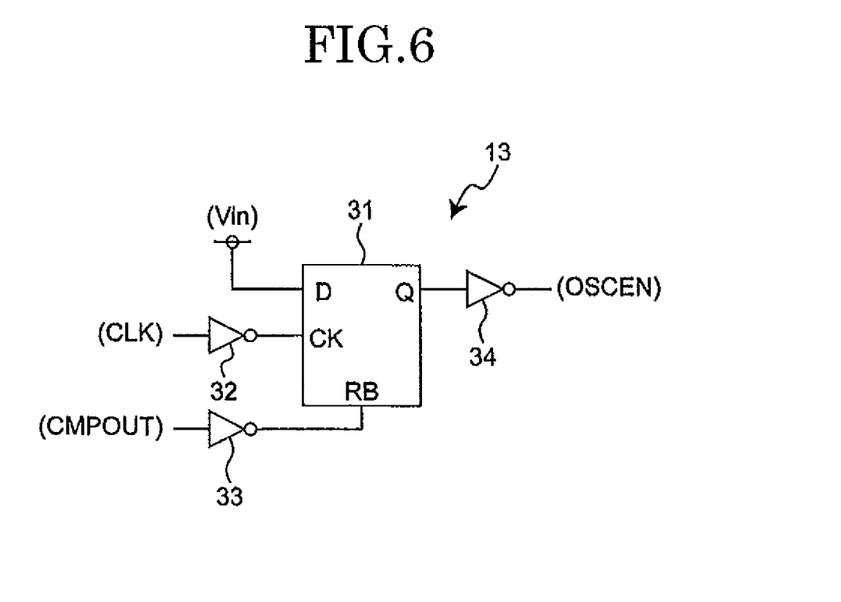
FIG. 6 is a diagram illustrating another circuit example of the oscillation control circuit 13 of FIG. 1.

FIG. 6 is a diagram illustrating another circuit example of the oscillation control circuit 13 of FIG. 1.

In FIG. 6, the oscillation control circuit 13 includes a D flip-flop circuit 31 and inverter circuits 32 to 34.

In the D flip-flop circuit 31, the input voltage Vin is inputted to an input D, and the clock signal CLK is inputted to a clock input CK via the inverter circuit 32, and the second comparison signal CMPOUT is inputted to a reset input RB via the inverter circuit 33. An output Q of the D flip-flop circuit 31 is connected to an input of the inverter circuit 34, and the enable signal OSCEN is outputted from an output of the inverter circuit 34. In addition, in the case of using the oscillation control circuit 13 of FIG. 6, each waveform signal illustrated in FIG. 5 can be obtained.

Figure 7:
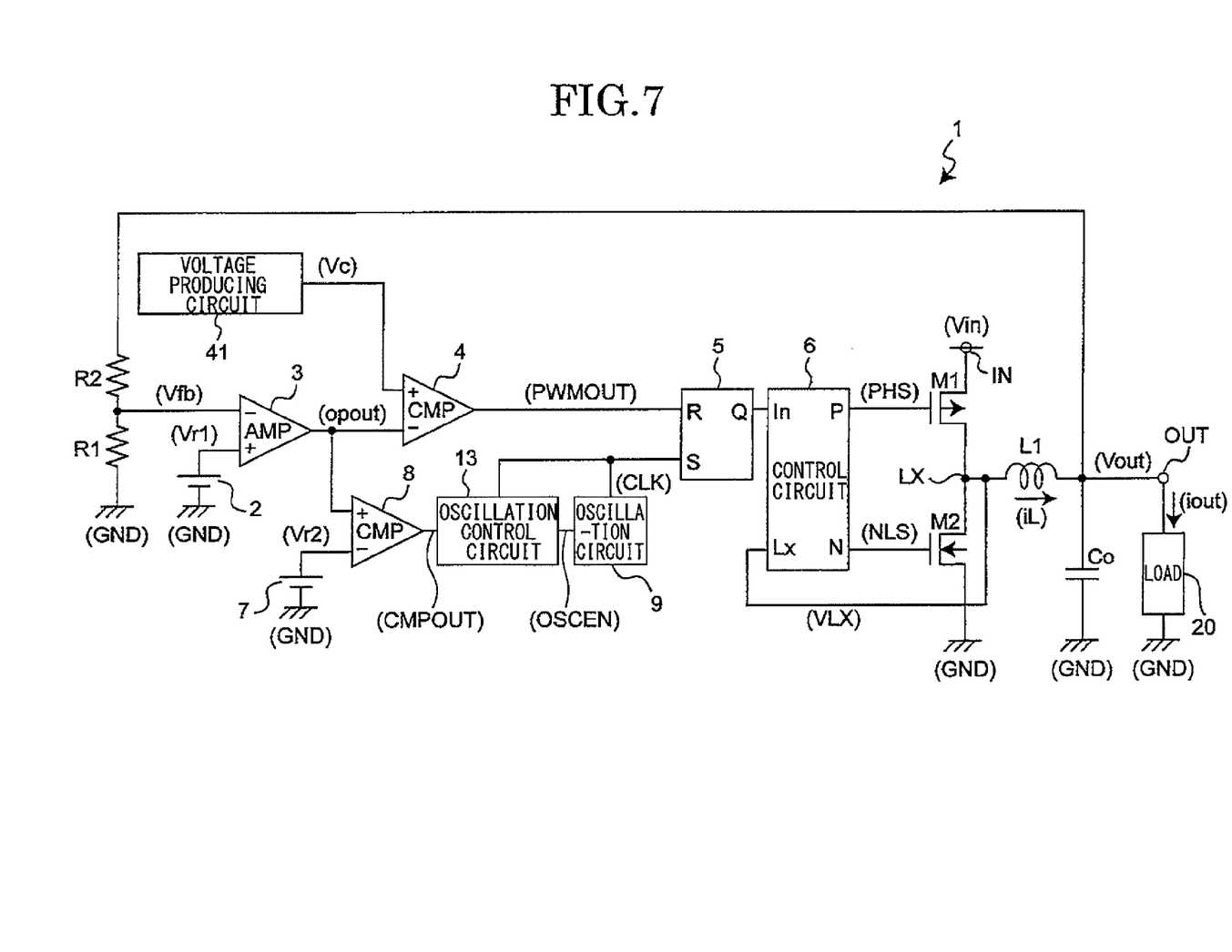
FIG. 7 is a diagram illustrating another circuit example of the switching regulator in the embodiment of the present invention.

An example of a current mode controlled switching regulator (see FIG. 1) has been explained; however the present invention is not limited to this and can be applied to a voltage mode controlled switching regulator (see FIG. 7), too. In FIG. 7, the same elements or the like as described in FIG. 1 are denoted by the same numerals, and here only a difference between FIG. 1 and FIG. 7 will be explained.

The difference between FIG. 1 and FIG. 7 is that a voltage producing circuit 41 is provided instead of the inductor current/voltage converter circuit 10, the slope voltage producing circuit 11 and the adding circuit 12 of FIG. 1. The voltage producing circuit 41 produces and outputs the ramp voltage Vc forming a predetermined triangle-wave voltage including a sawtooth-wave voltage.

In FIG. 7, the switching regulator 1 functions as a voltage mode controlled switching regulator of a synchronous rectification type which steps down the input voltage Vin inputted to the input terminal IN to a predetermined constant voltage and outputs as the output voltage Vout to the load 20 from the output terminal OUT. The switching regulator 1 performs the above step-down operation by automatically performing the switching of the PWM control and the VFM control based on the output voltage Vout.

The switching regulator 1 of FIG. 7 has a switching transistor M1, a synchronous rectification transistor M2, a first reference voltage generating circuit 2, resistances R1 and R2, an inductor L1, an output capacitor Co, an error amplifying circuit 3, a first comparator 4, an RS flip-flop circuit 5, a control circuit 6, a second reference voltage generating circuit 7, a second comparator 8, an oscillation circuit 9, an oscillation control circuit 13, and a voltage producing circuit 41. In FIG. 7, the first voltage comparison circuit section includes the first comparator 4 and the voltage producing circuit 41.

The voltage producing circuit 41 produces the ramp voltage Vc which repeats a rise and fall of a voltage at the same frequency as the clock signal CLK. The ramp voltage Vc outputted from the voltage producing circuit 41 is inputted to a non-inverting input of the first comparator 4. A configuration of the switching regulator 1 of FIG. 7 except for the voltage producing circuit 41, which is the same as the switching regulator 1 of FIG. 1, will not be explained here.

Thus, the switching regulator in the embodiment has such an oscillation control circuit 13 that immediately sets the enable signal OSCEN to be in a high state, when the error voltage opout becomes equal to or more than the second reference voltage Vr2 and the second comparison signal CMPOUT becomes in a high state, and sets the enable signal OSCEN to be in a low state, in a case where the second comparison signal CMPOUT is in a low state when the clock signal CLK becomes in a low state from a high state, and sets the enable signal OSCEN to be in a high state continuously, when the second comparison signal CMPOUT is in a high state.

In this manner, the maximum switching frequency in the VFM control mode can be controlled, and can be equal to the switching frequency in the PWM frequency mode. Therefore, there is no need to make consideration for the noise which is equal to or more than the switching frequency in the PWM control mode, and additionally it is possible to make the ripple of the output voltage Vout smaller and improve the efficiency in the VFM control mode.

According to the switching regulator and its operation control method of the present invention, because the maximum switching frequency in the VFM control mode can be controlled, the maximum switching frequency in the VFM control mode can be equal to the switching frequency in the PWM control mode and there is no need to make consideration for the noise which is equal to or more than the switching frequency in the PWM control mode, and furthermore the ripple of the output voltage can be made smaller, therefore it is possible to improve the efficiency in the VFM control mode.

Although the present invention has been described in terms of an exemplary embodiment, it is not limited hereto. It should be appreciated that variations may be made in the embodiment described by persons skilled in the art without departing from the scope of the present invention as defined by the following claims.

INDUSTRIAL APPLICABILITY

In the above embodiment, the switching regulator of the synchronous rectification type has been explained; however the present invention is not limited to this and can be applied to a step-down switching regulator of a non-synchronous rectification type using a diode instead of the synchronous rectification transistor M2, a step-up switching regulator and so on.

CROSS REFERENCE TO RELATED APPLICATION

The present application is based on and claims priority from Japanese patent application no. 2009-108001, filed Apr. 27, 2009, the disclosure of which is hereby incorporated by reference herein its entirety.

The invention claimed is:

1. A switching regulator which supplies an output voltage for an inductor and is a non-isolated type, the switching regulator converting an input voltage to a predetermined constant voltage and outputting as the output voltage and automatically performing a switching of a PWM control and a VFM control, comprising:
    a switch element which performs a switching based on a control signal inputted to a control electrode and a charge to the inductor by the input voltage;
    a rectification element which performs a discharge of the inductor when the switch element is turned off and the charge to the inductor is stopped;
    an error amplifying circuit section which amplifies a voltage difference between a feedback voltage proportional to the output voltage and a predetermined first reference voltage and outputs as an error voltage;
    a first voltage comparison circuit section which performs a voltage comparison of a ramp voltage which performs a voltage change set beforehand with the error voltage to be synchronized with the switching of the switch element and produces and outputs a first comparison signal which indicates a result of the comparison;
    a second voltage comparison circuit section which performs a voltage comparison of the error voltage with a predetermined second reference voltage and produces and outputs a second comparison signal which indicates a result of the comparison;
    an oscillation circuit section which includes an oscillation circuit which starts an oscillation operation based on a control signal provided by the oscillation circuit section to an input of the oscillation circuit, wherein the oscillation circuit produces and outputs a clock signal of a predetermined frequency, and the oscillation circuit section controls the oscillation operation of the oscillation circuit based on the second comparison signal; and
    a control circuit section which performs a switching control of the switch element based on the clock signal and the first comparison signal,
    wherein the oscillation circuit section starts the oscillation operation of the oscillation circuit based on the second comparison signal and stops the oscillation operation of the oscillation circuit based on the second comparison signal when the clock signal produced by the oscillation circuit is in a state opposite to a state where the switch element is turned on and the charge to the inductor is performed.

2. The switching regulator according to claim 1, wherein the oscillation circuit section further includes:
    an oscillation control circuit which controls the oscillation operation of the oscillation circuit based on the second comparison signal, and
    the oscillation control circuit receives the second comparison signal, and controls the operation of the oscillation circuit to change the clock signal from a first state to a second state, when the second comparison signal indicates that the error voltage is equal to or more than the second reference voltage, and when the second comparison signal indicates that the error voltage is less than the second reference voltage, the oscillation control circuit controls the operation of the oscillation circuit to change the clock signal from the second state to the first state.

3. The switching regulator according to claim 1, wherein the first voltage comparison circuit section adds a slope voltage having a slope of a voltage to time set beforehand to a voltage based on an inductor current flowing through the inductor and produces the ramp voltage.

4. The switching regulator according to claim 3, wherein the first voltage comparison circuit section includes: an inductor current/voltage converter circuit which detects an inductor current flowing through the inductor and converts the detected inductor current to a voltage and outputs the voltage;
a slope voltage producing circuit which produces and outputs a slope voltage having a slope of a voltage to time set beforehand;
an adding circuit which adds the output voltage from the inductor current/voltage converter circuit and the slope voltage from the slope voltage producing circuit and produces and outputs the ramp voltage; and
a first voltage comparison circuit which performs a voltage comparison of the ramp voltage with the error voltage and produces and outputs a first comparison signal which indicates a result of the comparison.

5. The switching regulator according to claim 1, wherein the first voltage comparison circuit section produces the ramp voltage which repeats a rise and fall of a voltage at the same frequency as the clock signal.

6. The switching regulator according to claim 1, wherein the control circuit section turns the switch element on based on the clock signal to perform the charge to the inductor, and turns the switch element off based on the first comparison signal to perform the discharge of the inductor.

7. The switching regulator according to claim 1, wherein the second reference voltage is set such that an output current from the output terminal in the case of a transition from the VFM control to the PWM control becomes the same as a current value of the output current at a critical point of a transition from a discontinuous operation mode to a continuous operation mode.

8. The switching regulator according to claim 1, wherein the rectification element includes a synchronous rectification switch element which performs a switching based on a control signal inputted to a control electrode and performs the discharge of the inductor, and the control circuit section performs a switching control for the switch element such that an output voltage from the output terminal becomes the predetermined constant voltage and controls the synchronous rectification switch clement to perform a switching operation opposite to the switch element.

9. The switching regulator according to claim 8, wherein the control circuit section turns the synchronous rectification switch clement off to be in a cutoff state, when a sign of an occurrence of a reverse current flowing in a direction from the output terminal toward the synchronous rectification switch element or an occurrence of the reverse current is detected from a voltage of a connection part between the switch element and the inductor.

10. An operation control method of a switching regulator, the switching regulator including: a switch element which performs a switching based on a control signal inputted to a control electrode; an inductor in which a charge is performed by an input voltage inputted to an input terminal by the switching of the switch element; a rectification element which performs a discharge of the inductor when the switch element is turned off and a charge to the inductor is stopped; and an oscillation circuit section including an oscillation circuit which starts an oscillation operation based on a control signal provided by the oscillation circuit section to an input of the oscillation circuit, the switching regulator performing a switching control for the switch element such that an output voltage from an output terminal becomes a predetermined constant voltage, and converting the input voltage inputted to the input terminal to a predetermined constant voltage and outputting as an output voltage from the output terminal, and automatically performing a switching of a PWM control and a VFM control, comprising the steps of:
amplifying a voltage difference between a feedback voltage proportional to the output voltage and a predetermined first reference voltage and producing an error voltage;
producing a ramp voltage which performs a voltage change set beforehand;
performing a voltage comparison of the error voltage with the ramp voltage to be synchronized with the switching of the switching element and producing a first comparison signal which indicates a result of the comparison;
performing a voltage comparison of the error voltage with a predetermined second reference voltage and producing a second comparison signal which indicates a result of the comparison;
producing by the oscillation circuit a clock signal of a predetermined frequency;
controlling, by the oscillation circuit section, the oscillation operation of the oscillation circuit based on the second comparison signal, including starting the oscillation operation of the oscillation circuit based on the second comparison signal, and stopping the oscillation operation of the oscillation circuit based on the second comparison signal when the clock signal produced by the oscillation circuit is in a state opposite to a state where the switch element is turned on and the charge to the inductor is performed;
controlling a producing operation of the clock signal to change the clock signal from a first state to a second state, when the second comparison signal indicates that the error voltage is equal to or more than the second reference voltage;
controlling the operation of the clock signal to change the clock signal from the second state to the first state, when the second comparison signal indicates that the error voltage is less than the second reference voltage; and
performing the switching control switch element based on the clock signal and the first comparison signal.

11. The operation control method of the switching regulator according to claim 10, comprising the steps of:
producing a voltage based on an inductor current flowing through the inductor,
adding a slope voltage having a slope of a voltage to et beforehand to the produced voltage, and
producing the ramp voltage.

12. The operation control method of the switching regulator according to claim 10, comprising the step of:
producing the ramp voltage which repeats a rise and fall of a voltage at the same frequency as the clock signal.

13. The operation control method of the switching regulator according to claim 10, comprising the steps of:
turning the switch element on based on the clock signal to perform the charge to the inductor, and
turning the switch clement off based on the first comparison signal to perform the discharge of the inductor.

* * * * *